(12) United States Patent
Samet (10) Patent No.: US 10,039,238 B2
(45) Date of Patent: Aug. 7, 2018

(54) MIXTURE FOR BIODEGRADABLE ARTICLES

(71) Applicant: BIOPLASMAR LTD., Ha'Ela (IL)

(72) Inventor: Chanoch Samet, Ha'Ela (IL)

(73) Assignee: BIOPLASMAR LTD., Ha'Ela (IL)

( * ) Notice: Subject to any disclaimer, the term of this patent is extended or adjusted under 35 U.S.C. 154(b) by 675 days.

(21) Appl. No.: 14/390,166

(22) PCT Filed: May 9, 2013

(86) PCT No.: PCT/IB2013/053756
§ 371 (c)(1),
(2) Date: Oct. 2, 2014

(87) PCT Pub. No.: WO2013/168120
PCT Pub. Date: Nov. 14, 2013

(65) Prior Publication Data
US 2015/0107155 A1    Apr. 23, 2015

Related U.S. Application Data

(60) Provisional application No. 61/644,445, filed on May 9, 2012.

(51) Int. Cl.
*A01G 9/02* (2018.01)
*C08L 97/02* (2006.01)
(Continued)

(52) U.S. Cl.
CPC ............... *A01G 9/021* (2013.01); *A01G 9/02* (2013.01); *A01G 9/0291* (2018.02); *C08L 1/02* (2013.01);
(Continued)

(58) Field of Classification Search
CPC ....... A01G 9/021; A01G 9/102; A01G 9/1086
(Continued)

(56) References Cited

U.S. PATENT DOCUMENTS 3,282,868 A * 11/1966 Frysinger ............... A01G 9/021
260/DIG. 43
4,045,204 A * 8/1977 Matsunaga ................ B01J 2/28
71/11
(Continued)

FOREIGN PATENT DOCUMENTS

CN    1131957 A    9/1996
CN    1247880 A    3/2000
(Continued)

OTHER PUBLICATIONS

Office Action of corresponding Chinese patent application No. 201380019981.5, dated Feb. 3, 2016 (9 pages).
(Continued)

*Primary Examiner* — David J Parsley
*Assistant Examiner* — Danielle A Clerkley
(74) *Attorney, Agent, or Firm* — Roach Brown McCarthy & Gruber, P.C.; Kevin D. McCarthy (57) ABSTRACT

The present invention provides a mixture based on at least one organic waste component having particles that are equal to or smaller than 2 mm., at least one organic adhesive component and at least one organic plasticizer or emulsifying agent, for the manufacture of biodegradable planting pots. The invention also provides a method for automatically planting a plant, by using a container fitted for automatic planting, filled with the biodegradable planting pots of the invention.

16 Claims, 4 Drawing Sheets

(51) Int. Cl.
*C08L 99/00* (2006.01)
*C08L 1/02* (2006.01)
*A01G 9/029* (2018.01)

(52) U.S. Cl.
CPC .............. *C08L 97/02* (2013.01); *C08L 99/00* (2013.01); *C08L 2201/06* (2013.01)

(58) Field of Classification Search
USPC .................. 47/65.5, 65.7, 74; 428/34.1, 34.2
See application file for complete search history.

(56) References Cited

U.S. PATENT DOCUMENTS

| | | | |
|---|---|---|---|
| 6,231,970 | B1 | 5/2001 | Andersen |
| 6,416,828 | B1 | 7/2002 | Miyazaki et al. |
| 6,517,600 | B1* | 2/2003 | Dinel ........................ C05F 9/04 71/21 |
| 8,123,904 | B2* | 2/2012 | Akhtar ..................... D21C 3/04 162/164.1 |
| 8,389,079 | B2* | 3/2013 | Babinsky ................ B32B 27/10 229/122.32 |
| 2004/0049980 | A1* | 3/2004 | Principe ............... A01G 9/1086 47/64 |
| 2007/0292643 | A1 | 12/2007 | Renn |
| 2010/0209636 | A1* | 8/2010 | Lai .......................... B32B 27/36 428/34.2 |
| 2011/0311784 | A1* | 12/2011 | Ceulemans ............ C09J 103/00 428/186 |

FOREIGN PATENT DOCUMENTS

| | | |
|---|---|---|
| CN | 1299238 A | 6/2001 |
| CN | 1552182 A | 12/2004 |
| JP | H08-56498 | 3/1996 |
| WO | 2009043580 A1 | 4/2009 |

OTHER PUBLICATIONS

European Search Report from a counterpart foreign application—European patent application No. 13787715.5 --, received Nov. 17, 2015, 4 pages.

* cited by examiner

MIXTURE FOR BIODEGRADABLE ARTICLES

FIELD OF THE INVENTION

The invention relates to the field of biodegradable containers and articles for disposable use, particularly for use in agriculture, and to mixtures used in the preparation of the biodegradable articles.

BACKGROUND OF THE INVENTION

A major source of preoccupation in modern society has been the amount of waste produced and its impact in the environment, increasing pollution and using valuable spaces as landfill. Thus, there has been great interest in the manufacture of biodegradable disposable articles, and especially when these are made from recycled or discarded material.

One application for biodegradable disposable containers is in the agricultural sector, for example in plant nurseries and green houses. Plants are grown in pots until they are mature enough to be distributed to retail outlets or to consumers. Typically, molded non-biodegradable plastic pots are used for growing plants, which end up being discarded after the plant is transplanted into the soil. The pots then end up in landfills or garbage dumps, where they remain for a very long time since they are not biodegradable.

Alternatives to conventional plastic pots exist. Biodegradable pots made of paper (cellulose fibers), peat and other organic waste are known. These pots are designed to degrade relatively quickly when buried in soil. This allows consumers to simply bury the pot with the plant in it, rather than having to remove the plant from the pot before planting. However, the biodegradable pots must also be substantially resistant to saturation by liquids so that they do not begin to disintegrate prior to being buried in soil.

Some biodegradable pots include a thermoplastic polymer layer which faces an interior of the plant pot which is exposed to soil placed in the plant pot. However, methods of irrigation and the humid environment in many nurseries cause the external surfaces of pots to be exposed to moisture, so that a sealant on the interior of a plant pot does not prevent degradation of the pot while still on the shelf in the nursery.

Nurseries also use plug trays for plant transplants. In plug trays each transplant grows in an individual cell avoiding competition among plants and providing uniformity of the plants.

Planting seedlings in the field typically involves extracting each plug out of the tray and transplanting it in soil. Transplanting often causes shock due to damaged done to the roots while being extracted from the tray.

The standards by which the quality of planting is measured include placing the seedling plugs without exerting damaging pressure on the roots, evenly spacing the seedlings, planting the seedlings upright and properly covering the plugs. By these standards automated transplanting produces better results than manual transplanting. Thus, transplantation nowadays is mostly automated (particularly in rich countries). However, automated transplanting requires the use of large expensive transplanter machines, or cheaper machines that require the use of human labor. Furthermore, the transplanter machines only works efficiently in dry and broken up soils. Unfortunately, transplanting in dry soil in hot climates can be fatal for the young plants. Thus farmers typically irrigate the soil before transplantation, which results in muddy fields which hinder the functioning of the transplanter machines.

SUMMARY OF THE INVENTION

It is an object of the present invention to provide a mixture derived from organic waste and other organic components, which is used in the manufacture of biodegradable containers and articles, and in particular in the manufacture of pots and trays used for agriculture.

In one embodiment, the present invention provides a mixture comprising at least one organic waste component, at least one organic adhesive component and at least one organic plasticizer or emulsifying agent, wherein the organic waste component includes particles that are equal to or smaller than 2 mm the mixture, in some embodiments of the present invention, further comprises water, mucilage, a sorbic acid salt, propylene, or any combination thereof. In some embodiment, the mixture is utilized in making a plant bio-degradable container.

It is a further object of the present invention to provide biodegradable trays for growing seedlings, which are adapted for automated planting without the need of transplanting the plant out of the biodegradable pot as described herein. In another embodiment, further provided herein is a method for automatically planting a plant, comprising the step of: a. providing an automatic planting container comprising a plant in a plant bio-degradable article, and b. automatically planting the plant bio-degradable container, thereby automatically planting a plant.

In another embodiment, further provided herein is a process for making a biodegradable pot mixture, comprising the steps of: a. obtaining a methylcellulose solution; and b. mixing the methylcellulose solution, the organic plasticizer, flour, organic waste component and water, thereby making the biodegradable pot mixture.

BRIEF DESCRIPTION OF THE FIGURES

The invention will now be described in relation to certain examples and embodiments with reference to the following illustrative figures so that it may be more fully understood. In the drawings.

DETAILED DESCRIPTION OF THE INVENTION

The present inventors have attained a biodegradable mixture, utilizing organic waste as a main component, which mixture is used in the manufacture of biodegradable containers or articles for housing plants. In one embodiment. Plants are young plants or seedlings. The mixture, described herein, has been optimized for use in housing agriculture and home gardening-related plants.

In one embodiment, the present invention presents biodegradable plant pots and other containers, used in agriculture, produced from organic waste (such as wood-waste and soil) and adhesives, optionally coated with biopolymers. Thus, this product is completely biodegradable and recyclable. In one embodiment, a biodegradable pot comprising a plant is placed at a planting site and is degraded in-situ. In one embodiment, the degrading biodegradable pot enriched the soil at a site of transplanting with nutrients, fertilizers, anti-mold agent, anti-fungal agent, and/or anti-yeast agent. In some embodiments, the pots described herein are utilized in automating planting and remain within the planted soil. In some embodiments, the pots disintegrate after planting and further enrich the planted soil with nutrient and plant growth stimulators. In another embodiment, the invention also provides a method for automatically planting a plant, by using an automatic planting container fitted for automatic planting, filled with biodegradable planting pots of the invention. In another embodiment, the phrases "an automatic planting container" and "a container fitted for automatic planting" are readily understood by one of skill in the art and include mechanized agricultural and gardening methods that often involve mass planting of pots placed in a container adapted to fit the mechanized method.

In another embodiment, automatically planting a plant includes precision farming technologies. In another embodiment, automatically planting a plant includes utilizing SSM (small smart machines). In another embodiment, automatically planting a plant includes phytotechnology. In another embodiment, automatically planting a plant includes plant-scale husbandry technologies. In another embodiment, automatically planting a plant includes using Intelligently Targeted Inputs (ITI) technologies. In another embodiment, automatically planting a plant includes using Zero draft force technologies. In another embodiment, automatically planting a plant includes using Zero compaction technology. In another embodiment, automatically planting a plant includes using Task oriented Automatic Sub Systems (TASS).

The invention, according to one embodiment, presents the means for receiving plants in the nursery which can be later transferred to the field or garden without the need for removing and collecting the pot prior to transplanting; plant and pot become one unit: "plant-pot". The "plant-pot" does not only fulfill its functions as a "container", providing support for the plant, but it is also an integrated system. In addition to operational and environmental advantages, this system: (i) provides the plant root system with a protective environment during the sensitive period post-planting; (ii) in the course of the development of the plant, the pot material is degraded by soil microorganisms, incorporated into the soil organic matter, adding to soil fertility in a similar manner as compost application; and (iii) provides a potential carrier for an array of supplements such as plant nutrients and anti-pests and anti-disease agents of chemical or biological origin.

One major advantage of the container manufactured with the mixture provided by the invention is its decomposition and integration with the soil organic matter, after its role as a container ends.

Thus, in a first aspect the present invention provides a mixture comprising:
(a) at least one organic waste component;
(b) at least one organic adhesive component;
(c) optionally, at least one organic plasticizer, mucilage, anti-fungal agent, anti-mold agent, anti-yeast agent, sorbate acid salt, emulsifying agent or any combination thereof; and
(d) optionally, water.

In one embodiment of the invention, the weight (w:w) ratio between the organic waste and organic adhesive (components a:b of the mixture) ranges from about 1:1 to 3:1. In one embodiment of the invention, the weight (w:w) ratio between the organic waste and organic adhesive (components a:b of the mixture) is about 2:1. In one embodiment of the invention, the weight (w:w) ratio between the organic waste and organic adhesive (components a:b of the mixture) is about 1:1.

In one embodiment of the invention, the weight ratio within mixture of water compared to the organic waste is at least 1.5. In one embodiment of the invention, the weight ratio within mixture of water compared to the organic waste is at least 1.8. In one embodiment of the invention, the weight ratio within mixture of water compared to the organic waste is at least 2.0. In one embodiment of the invention, the weight ratio within mixture of water compared to the organic waste is at least 2.2.

In one embodiment of the invention, the weight ratio within mixture of water compared to the organic adhesive is at least 1.5 and small than 10. In one embodiment of the invention, the weight ratio within mixture of water compared to the organic adhesive is at least 1.8 and smaller than 8. In one embodiment of the invention, the weight ratio within mixture of water compared to the organic adhesive is at least 2.0 and smaller than 5. In one embodiment of the invention, the weight ratio within mixture of water compared to the organic adhesive is at least 2.0 and smaller than 4.

In one embodiment of the invention, the weight ratio within mixture of organic waste compared to the organic adhesive is at least 1.5 and smaller than 8. In one embodiment of the invention, the weight ratio within mixture of organic waste compared to the organic adhesive is at least 1.8 and smaller than 5. In one embodiment of the invention, the weight ratio within mixture of organic waste compared to the organic adhesive is at least 2 and smaller than 4.

In one embodiment of the invention, the organic waste component comprises cellulose and minerals. According to some embodiments the organic waste component is any one of wood chips, sawdust, soil, dirt, lop, grass clippings, leaves, hay, straw, shredded bark, whole bark nuggets, sawdust, shells, woodchips, shredded newspaper, cardboard, wool, peat, calcium carbonate (typically used in industry to entrap impurities, such as in the sugar production industry), coffee residues, wood ash or other organic material ash, or any combination thereof. In one embodiment, soil is compost. In one embodiment, a composition as described herein comprises is cellulose glycol.

In one embodiment of the invention, the organic waste component comprises particles that are equal to or smaller than 4 mm. In one embodiment of the invention, the organic waste component comprises particles that are equal to or smaller than 3 mm. In one embodiment of the invention, the organic waste component comprises particles that are equal to or smaller than 2.8 mm. In one embodiment of the invention, the organic waste component comprises particles that are equal to or smaller than 2.5 mm. In one embodiment of the invention, the organic waste component comprises particles that are equal to or smaller than 2.2 mm. In one embodiment of the invention, the organic waste component comprises particles that are equal to or smaller than 2 mm. In one embodiment of the invention, more than 80% of the organic waste component particles are equal to or smaller than 2 mm (in any direction). In one embodiment of the invention, more than 85% of the organic waste component particles are equal to or smaller than 2 mm (in any direction).

In one embodiment of the invention, more than 90% of the organic waste component particles are equal to or smaller than 2 mm (in any direction). In one embodiment of the invention, more than 95% of the organic waste component particles are equal to or smaller than 2 mm (in any direction).

In one specific embodiment, the organic waste component is a mixture of any two or more components selected from: soil, ash, compost, woodchips, and saw dust. In another embodiment, compost is any compost known to one of average skill in the art. In another embodiment, compost is the result of Grub composting. In another embodiment, compost is Bokashi compost. In another embodiment, a compost comprises EM1 (lactica acid bacteria, yeast and phototrophic (PNSB) bacteria). In another embodiment, compost is compost tea. In another embodiment, compost is Hügelkultur. In another embodiment, compost comprises Humanure. In another embodiment, compost is Vermicompost.

According to some embodiments of the invention the organic waste component includes material having different sized particles. The particles may be between 0.125 mm-2 mm in size. According to one embodiment particles of a size larger than 2 mm are used.

Best results may be obtained when the soil is rich in clay. Clay is the most active mineral component of soil. It is a colloidal and crystalline material. In soils, clay is defined in a physical sense as any mineral particle less than two microns in effective diameter. Clay is now known to be a precipitate with a mineralogical composition different from its parent materials and is classed as a secondary mineral. The type of clay that is formed is a function of the parent material and the composition of the minerals in solution. The clays of soil are a mixture of the various types of clay (crystalline, amorphous or sesquioxide) but one type predominates. One example of an ideal soil to be employed in the mixture of the invention is the soil found in Northwestern Europe, e.g. in Germany.

In another embodiment of the invention, the organic adhesive component is any one of a starch containing material (such as flour), methylcellulose, carboxymethylcellulose, or a combination thereof. In one specific embodiment, two organic adhesive components are included in the mixture of the invention, e.g., flour and methylcellulose.

In another embodiment, the weight (w:w) ratio between the organic adhesive component and the organic waste ranges from 1:1 to 1:3. In another embodiment, the weight (w:w) ratio between the organic adhesive component and the organic waste ranges from 1:1 to 1:2. In another embodiment, the weight (w:w) ratio between the organic adhesive component and the organic waste ranges from 1:1 to 1:3. In another embodiment, the weight (w:w) ratio between the organic adhesive component and the organic waste ranges from 1:1.5±20%. In another embodiment, the weight (w:w) ratio between the organic adhesive component and the organic waste component is 1:1.5±10%.

Flour is known for its adhesive properties. It is to be understood that the term "flour" may include any one of wheat flour, flour from grains, such as those chosen from buckwheat flour, semolina flour, corn flour, corn starch, corn sledge, rice flour, tapioca flour, potato flour, soy flour, ground flax meal, flax flour, hemp flour, and any mixtures thereof.

According to one embodiment two adhesives are added to the mixture. According to one embodiment one of the adhesives is methylcellulose, typically in a 1.25% solution. For stronger adhesiveness a more concentrated (e.g., a 1.5% aqueous solution) methylcellulose stock may be used.

According to some embodiments a plasticizer or emulsifying agent is added to the mixture to provide plasticity to the mixture to avoid cracking of receptacles made with this mixture.

Thus, in another embodiment of the invention, the mixture further comprises any one of glycerol, glycerin, polyethylene glycol (PEG), or any other suitable emulsifier. In one specific embodiment, the mixture comprises glycerol.

Glycerol (or any of its appropriate equivalents) provides a certain degree of flexibility, stretch ability or elasticity to the mixture, which translates into shock-resistance properties to the articles or containers manufactured with the mixture of the invention. This property may be particularly relevant during the manufacturing process, but also when the articles or containers are transported to and from retailers.

In some embodiments, the mixture further comprises mold, fungus, and/or yeast inhibitor. In one embodiment, the inhibitor is potassium sorbate. In one embodiment, the inhibitor is calcium sorbate. In one embodiment, the inhibitor is Sorbic Acid. In one embodiment, the inhibitor is Natamycin. In one embodiment, the inhibitor is calcium Acetate. In one embodiment, the inhibitor is calcium Propionate. In one embodiment, the inhibitor is potassium Propionate. In one embodiment, the inhibitor is Sodium Diacetate.

In another embodiment, the weight (w:w) ratio between the organic adhesive component and the mold, fungus, and/or yeast inhibitor ranges from 10:1 to 30:1. In another embodiment, the weight (w:w) ratio between the organic adhesive component and the mold, fungus, and/or yeast inhibitor 20:1±30%. In another embodiment, the weight (w:w) ratio between the organic adhesive component and the mold, fungus, and/or yeast inhibitor is 20:1±20%. In another embodiment, the weight (w:w) ratio between the organic adhesive component and the mold, fungus, and/or yeast inhibitor is 20:1±15%.

In some embodiments, the mixture further comprises mucilage. In one embodiment, mucilage is a thick mixture of polar glycoprotein and an exopolysaccharide produced by a plant or a microorganism.

In some embodiments, mucilage is derived from *Aloe vera*. In another embodiment, mucilage is derived from *Basella alba* (Malabar spinach). In another embodiment, mucilage is derived from cactus. In another embodiment, mucilage is derived from *Chondrus crispus* (Irish moss). In another embodiment, mucilage is derived from *Dioscorea opposita* (nagaimo, Chinese yam). In another embodiment, mucilage is derived from *Drosera* (sundews). In another embodiment, mucilage is derived from *Drosophyllum lusitanicum*. In another embodiment, mucilage is derived from fenugreek. In another embodiment, mucilage is derived from flax seeds. In another embodiment, mucilage is derived from kelp. In another embodiment, mucilage is derived from liquorice root. In another embodiment, mucilage is derived from marshmallow. In another embodiment, mucilage is derived from mallow. In another embodiment, mucilage is derived from mullein. In another embodiment, mucilage is derived from okra. In another embodiment, mucilage is derived from *parthenium*. In another embodiment, mucilage is derived from *pinguicula* (butterwort). In another embodiment, mucilage is derived from Psyllium seed husks. In another embodiment, mucilage is derived from *salvia hispanica* (chia) seed. In another embodiment, mucilage is derived from *Ulmus rubra* bark (slippery elm).

In one embodiment, mucilage is *Trigonella foenum-graecum* mucilage. In another embodiment, the weight (w:w)

ratio between the organic adhesive component and mucilage ranges from 10:1 to 30:1. In another embodiment, the weight (w:w) ratio between the organic adhesive component and mucilage is 20:1±30%. In another embodiment, the weight (w:w) ratio between the organic adhesive component and mucilage is 20:1±20%. In another embodiment, the weight (w:w) ratio between the organic adhesive component and mucilage is 20:1±15%.

In another embodiment, a mixture as described herein comprises both sawdust and compost. In another embodiment, the weight (w:w) ratio between sawdust and compost is 4:1 to 1:2. In another embodiment, the weight (w:w) ratio between sawdust and compost is 3:1 to 1:1. In another embodiment, the weight (w:w) ratio between sawdust and compost is 2:1 to 1:1. In another embodiment, the weight (w:w) ratio between sawdust and compost is 2:1±30%. In another embodiment, the weight (w:w) ratio between sawdust and compost is 2:1±20%. In another embodiment, the weight (w:w) ratio between sawdust and compost is 2:1±10%. In another embodiment, the weight (w:w) ratio between sawdust and compost is 1:1±30%. In another embodiment, the weight (w:w) ratio between sawdust and compost is 1:1±20%. In another embodiment, the weight (w:w) ratio between sawdust and compost is 1:1±10%.

In another embodiment, a mixture as described herein comprises both soil and compost. In another embodiment, the weight (w:w) ratio between soil and compost ranges from 4:1 to 1:2. In another embodiment, the weight (w:w) ratio between soil and compost is 3:1 to 1:1. In another embodiment, the weight (w:w) ratio between soil and compost ranges from 2:1 to 1:1. In another embodiment, the weight (w:w) ratio between soil and compost is 2:1±30%. In another embodiment, the weight (w:w) ratio between soil and compost is 2:1±20%. In another embodiment, the weight (w:w) ratio between soil and compost is 2:1±10%. In another embodiment, the weight (w:w) ratio between soil and compost is 1:1±30%. In another embodiment, the weight (w:w) ratio between soil and compost is 1:1±20%. In another embodiment, the weight (w:w) ratio between soil and compost is 1:1±10%. In another embodiment, the weight (w:w) ratio between soil and compost is 1:2±30%. In another embodiment, the weight (w:w) ratio between soil and compost is 1:2±20%. In another embodiment, the weight (w:w) ratio between soil and compost is 1:2±10%.

In some embodiments, the mixture further comprises Propylene glycol. In some embodiments, Propylene glycol is used according to the invention as a humectant. In some embodiments, Propylene glycol is used to prevent cracks in a pot made from the mixture as described herein.

In another embodiment, a mixture as described herein is used a building material for in-situ degradable plant pots. In some embodiment, the mixture comprises water. In some embodiments, the volume (v:v) ratio between water and the emulsifier ranges from 4:1 to 45:1. In some embodiments, the volume (v:v) ratio between water and the emulsifier ranges from 8:1 to 40:1. In some embodiments, the volume (v:v) ratio between water and the emulsifier ranges from 10:1 to 35:1. In some embodiments, the volume (v:v) ratio between water and the emulsifier ranges from 15:1 to 30:1. In some embodiments, the volume (v:v) ratio between water and the emulsifier is 23:1±20%.. In some embodiments, the volume (v:v) ratio between water and the emulsifier is 23:1±10%. In one embodiment, the emulsifier is glycerol.

In some embodiments, the volume (v:v) ratio between the emulsifier and the organic adhesive component (the organic adhesive component is in a solution containing the adhesive component in a concentration of 12.5 gr per 1 liter of water) ranges from 10:1 to 1:10. In some embodiments, the volume (v:v) ratio between the emulsifier and the organic adhesive ranges from 5:1 to 1:5. In some embodiments, the volume (v:v) ratio between the emulsifier and the organic adhesive ranges from 1:3 to 3:1. In some embodiments, the volume (v:v) ratio between the emulsifier and the organic adhesive ranges from 2:1 to 1:2. In some embodiments, the volume (v:v) ratio between the emulsifier and the organic adhesive component is 1:1±20%. In some embodiments, the volume (v:v) ratio between the emulsifier and the organic adhesive component is 1:1±10%. In one embodiment, the organic adhesive component is methylcellulose. In one embodiment, the emulsifier is glycerol.

In some embodiments, the volume (v:v) ratio between water and the organic adhesive component (the organic adhesive component is in a solution containing the adhesive component in a concentration of 12.5 gr per 1 liter of water) ranges from 4:1 to 45:1. In some embodiments, the volume (v:v) ratio between water and the organic adhesive ranges from 8:1 to 40:1. In some embodiments, the volume (v:v) ratio between water and the organic adhesive ranges from 10:1 to 35:1. In some embodiments, the volume (v:v) ratio between water and the organic adhesive ranges from 10:1 to 20:1. In some embodiments, the volume (v:v) ratio between water and the organic adhesive component is 23:1±20%. In some embodiments, the volume (v:v) ratio between water and the organic adhesive component is 23:1±10%. In one embodiment, the organic adhesive component is methylcellulose.

In some embodiments, the volume (v:v) ratio between the emulsifier and propylene glycol ranges from 5:1 to 1:1. In some embodiments, the volume (v:v) ratio between the emulsifier and propylene glycol ranges from 4:1 to 1:1. In some embodiments, the volume (v:v) ratio between the emulsifier and propylene glycol ranges from 3:1 to 1:1. In some embodiments, the volume (v:v) ratio between the emulsifier and propylene glycol ranges from 1.8:1 to 1.2:1. In some embodiments, the volume (v:v) ratio between the emulsifier and propylene glycol is 1.6:1±20%. In some embodiments, the volume (v:v) ratio between the emulsifier and the organic adhesive component is 1.6:1±10%. In one embodiment, the emulsifier is glycerol.

In some embodiments, a pot as described herein consists or comprises the mixture and a coating layer. In some embodiments, a pot as described herein consists or comprises the mixture, a coating layer, and soil/compost as planting bedding. In some embodiments, a pot as described herein consists or comprises the mixture, a coating layer, soil/compost, and a plant.

In some embodiments, an uncoated pot average weight is: 75.0±8.0 g. In some embodiments, an uncoated pot average weight is: 75.0±6.0 g. In some embodiments, an uncoated pot average weight is: 75.0±4.0 g. In some embodiments, an uncoated pot average weight is: 75.0±3.0 g. In another embodiment, the phrase "uncoated pot" is uncoated standard 12 cm pot. In another embodiment, one of skill in the art can readily adapt the physical properties and measures to bigger or smaller pots.

In some embodiments, an uncoated pot average material density is: 0.79±0.5 g/mL. In some embodiments, an uncoated pot average material density is: 0.79±0.4 g/mL. In some embodiments, an uncoated pot average material density is: 0.79±0.3 g/mL. In some embodiments, an uncoated pot average material density is: 0.79±0.4 g/mL.

In some embodiments, the thickness of an uncoated pot is as follows: upper rim 0.4±0.1 cm; body 0.25±0.1 cm; base 0.8±0.1 cm. In some embodiments, the thickness of an uncoated pot is as follows: upper rim 0.4±0.07 cm; body 0.25±0.07 cm; base 0.8±0.07 cm. In some embodiments, the thickness of an uncoated pot is as follows: upper rim 0.4±0.05 cm; body 0.25±0.05 cm; base 0.8±0.05 cm.

In some embodiments, the vertical strength of the uncoated pot (experimental details below) was measured by the application of 70 kg of weight applied vertically to the pot rim, (as described below), and is equivalent to 2-8 kg/cm2, 4-6 kg/cm2, or 5 kg/cm2, Vertical strength of coated pot=80 kg pressure applied on pot rim (described below) is 3-10 kg/cm2, 4-8 kg/cm2, or 5-7 kg/cm2. In some embodiments, the lateral strength of uncoated pot is 1-6 kg. In some embodiments, the lateral strength of uncoated pot is 2-5 kg. In some embodiments, the lateral strength of coated pot is 4-10 kg. In some embodiments, the lateral strength of coated pot is 5-8 kg. In some embodiments, the lateral strength of coated pot is 5-7 kg.

In another embodiment, the punch test strength (experimental details below) of an uncoated pot is 6.4 kg/cm2±30% near the top of the pot, 10.6 kg/cm2±30% near bottom of the pot, for an average of 8.5 kg/cm2±30%. In another embodiment, the punch test strength of an uncoated pot is 6.4 kg/cm2±15% near the top of the pot, 10.6 kg/cm2±15% near the bottom of the pot for an averag of of 8.5 kg/cm2±15%. In another embodiment, the punch test strength of an uncoated pot is 6.4 kg/cm2±10% near the top of the pot, 10.6 kg/cm2±10% near the bottom of the pot, for an averag of 8.5 kg/cm2±10%.In another embodiment, the punch test strength of an uncoated pot is 6.4 kg/cm2±5% near the top of the pot, 10.6 kg/cm2±5%. near the bottom of the pot, for an average of 8.5 kg/cm2±5%.

35 In another embodiment, the unch test strength (experimental details below) of the coated potis 8.5 kg/cm2±30% near the top of the pot, 13.8 kg/cm2±30% near the bottom of the pot, for an average of 11.2 kg/cm2±30%. In another embodiment, the punch test strength of a coated potis 8.5 kg/cm2±15% near the top of the pot, 13.8 kg/cm2±15% near the bottom of the pot, for an average of 11.2 kg/cm2±15%. In another embodiment, the punch test strength of a coated pot is 8.5 kg/cm2±10% near the top of the pot, 13.8 kg/cm2±10% near the bottom of the pot, for an average of 11.2 kg/cm2±10%. In another embodiment, the punch test strength of a coated pot is 8.5 kg/cm2±5% near the top of the pot, 13.8 kg/cm2±5% near the bottom of the pot, for an/verage of 11.2 kg/cm2±5%.

36 In another embodiment, a pot as described herein is prepared according to the following steps: optional pre-preparation of wood chips or sawdust by soaking in an organic acid solution. A fraction (10-30%) of the starch from the overall recipe is added and steam is applied to approximately 15% humidity.

In another embodiment, the Punch test strength of uncoated pot is: top of pot/near bottom of pot/average is 6.4/10.6/8.5 kg/cm$^2$±30%. In another embodiment, the Punch test strength of uncoated pot is: top of pot/near bottom of pot/average is 6.4/10.6/8.5 kg/cm$^2$±15%. In another embodiment, the Punch test strength of uncoated pot is: top of pot/near bottom of pot/average is 6.4/10.6/8.5 kg/cm$^2$±10%. In another embodiment, the Punch test strength of uncoated pot is: top of pot/near bottom of pot/average is 6.4/10.6/8.5 kg/cm$^2$±5%.

In another embodiment, the Punch test strength of coated pot: top of pot/near bottom of pot/average is 8.5/13.8/11.2 kg/cm$^2$±30%. In another embodiment, the Punch test strength of coated pot: top of pot/near bottom of pot/average is 8.5/13.8/11.2 kg/cm$^2$±15%. In another embodiment, the Punch test strength of coated pot: top of pot/near bottom of pot/average is 8.5/13.8/11.2 kg/cm$^2$±10%. In another embodiment, the Punch test strength of coated pot: top of pot/near bottom of pot/average is 8.5/13.8/11.2 kg/cm$^2$±5%.

In another embodiment, a pot as described herein is prepared according to the following steps: optionally pre-preparation of wood chips or sawdust by soaking it in an organic acid solution. Then about 25% the flour (starch) is added and steam is applied to approximately 15% humidity.

In another embodiment, the invention further provides a process for making a mixture, comprising the steps of: a. obtaining a methylcellulose solution; and b. mixing methylcellulose solution, an organic plasticizer, flour, an organic waste component and water. In another embodiment, step b. further includes adding and mixing mucilage, a sorbic acid salt, or a combination thereof. In another embodiment, an organic waste component comprises compost, soil, ash, wood chips or their combination.

In another embodiment, the process of preparing the mixture is performed under constant mixing. In some embodiments, lukewarm water (20-30°), methylcellulose, propylene glycol, and glycerol are mixed. In another embodiment, mixing is mixing until the mixture is homogenous.

In another embodiment, potassium sorbate and/or calcium sorbate are added to the mixture. In another embodiment, organic acid treated wood chips and/or sawdust are added to the lukewarm water, methylcellulose, propylene glycol, and glycerol mixture. In another embodiment, mucilage is further added to the mixture. In another embodiment, each step of adding a material to the mixture is accompanied by mixing.

In another embodiment, ash or any source of cellulosic/lignocellulosic material is further added and mixed. In another embodiment, the 75% remaining flour is added and mixed. In another embodiment, compost is added and mixed. In another embodiment, soil/dirt mixture is added and mixed. In another embodiment, slow-release fertilizer (e.g. Osmocoat, potassium humate granular, etc.) is optionally added and mixed.

In another embodiment, dough was stored in a proofer to maintain moisture levels and to increase material temperature to 30-50° C. In another embodiment, pots are made by press.

In another embodiment, pots are made by assembling three distinct parts made by press: the base, or 'male' counterpart; the sheath, or 'female' counterpart; and the plunger. In another embodiment, the sheath and plunger are combined into one piece (the sheath-plunger). In some embodiments, the parts of the press are pre-heated (base: 120-150° C., sheath: 140-180° C., plunger: 140-170° C., or sheath-plunger: 140-180° C.). In some embodiments, each part is further oiled with an emulsion of water and palm oil in a 40:60 ratio, a 50:50 ratio, a 60:40 ratio or any ratio ranging from 70:30 to 30:70. In another embodiment, the dough was separated via automated procedure into small flattened-spherical masses, whose weight were depend on the product being formed (e.g. for 12 cm pot—130-150 gr each).

In another embodiment, the masses of the mixture to be used were situated onto the base of mold; and the plunger or the sheath-plunger is raised slowly down all the way onto the base (30-180 s). In another embodiment, the temperature of the mold pieces was increased to: base, 180-220° C.; sheath, 180-220° C.; plunger, 160-200° C., or sheath-plunger, 160-200° C., then the mixture is baked for 3-9 minutes.

In another embodiment, the mixture is injected and molded into its final shape. In another embodiment, the mold is either opened at once, or pre-cooled and then opened; the pot is then removed from the base, and allowed to further cool to room temperature. In another embodiment, the pots are further coated as described in co-pending PCT application PCT/IL2011/000739.

In one specific embodiment of the invention, and as exemplified in the Examples and in FIG. 1 herein below, in order to produce, for example, a flower pot of 12 cm diameter, the mixture of the invention comprises:
(a) 55-65 g (i.e. 55, 56, 57, 58, 59, 60, 61, 62, 63, 64 or 65 g, including any fractions thereof) of saw dust combined with soil;
(b) 25-35 g (i.e. 25, 26, 27, 28, 29, 30, 31, 32, 33, 34 or 35 g, including any fractions thereof) of flour;
(c) 1.8-2.2 mL (i.e. 1.8, 1.9, 2.0, 2.1 or 2.2 g including any fractions thereof) of a 1.25% (w:w) methylcellulose solution in water;
(d) 1.8-2.2 mL (i.e. 1.8, 1.9, 2.0, 2.1 or 2.2 g including any fractions thereof) of glycerol;
(e) 55-65 g (or mL) (i.e. 55, 56, 57, 58, 59, 60, 61, 62, 63, 64 or 65 g, including any fractions thereof) of water.

It should be understood that if the above represented values are relevant to 12 cm-diameter plant pots, these amounts may be proportionately increased in order to produce larger size plant pots.

Thus, according to one embodiment, the weight (w:w) ratio between the mixture of the organic waste component, the adhesive component and water is in the range from about 2:1:2 to about 1.5:1:1.5.

Mixtures according to embodiments of the invention can form dough like material, which, upon drying may become rigid.

In another aspect the present invention provides a biodegradable container. In another aspect the present invention provides that the phrase "bio-degradable container" is synonymous with the terms "bio-degradable article" or "bio-degradable pot". Articles made of the mixtures according to embodiments of the invention may be made as rigid as required, depending on parameters such as the specific ratios of dry (e.g., organic waste and adhesive components) and wet materials (e.g., water) used in the mixture, the particle size of the dry material (larger particles imparting better solidity), the temperature during pressing and other parameters.

The invention is particularly useful for articles or containers used in agriculture and home gardening, such as plant pots, plug trays, and any containers or receptacles of similar use.

In a further aspect of the invention, the bio-degradable container or article may be coated or treated with a bio-degradable coating comprising polylactic acid (PLA), ethyl acetate and dichloromethane. A full description of a coating that may be used, according to embodiments of the invention is provided in co-pending PCT application PCT/IL2011/000739 which is hereby incorporated by reference in its entirety.

Figure 1:
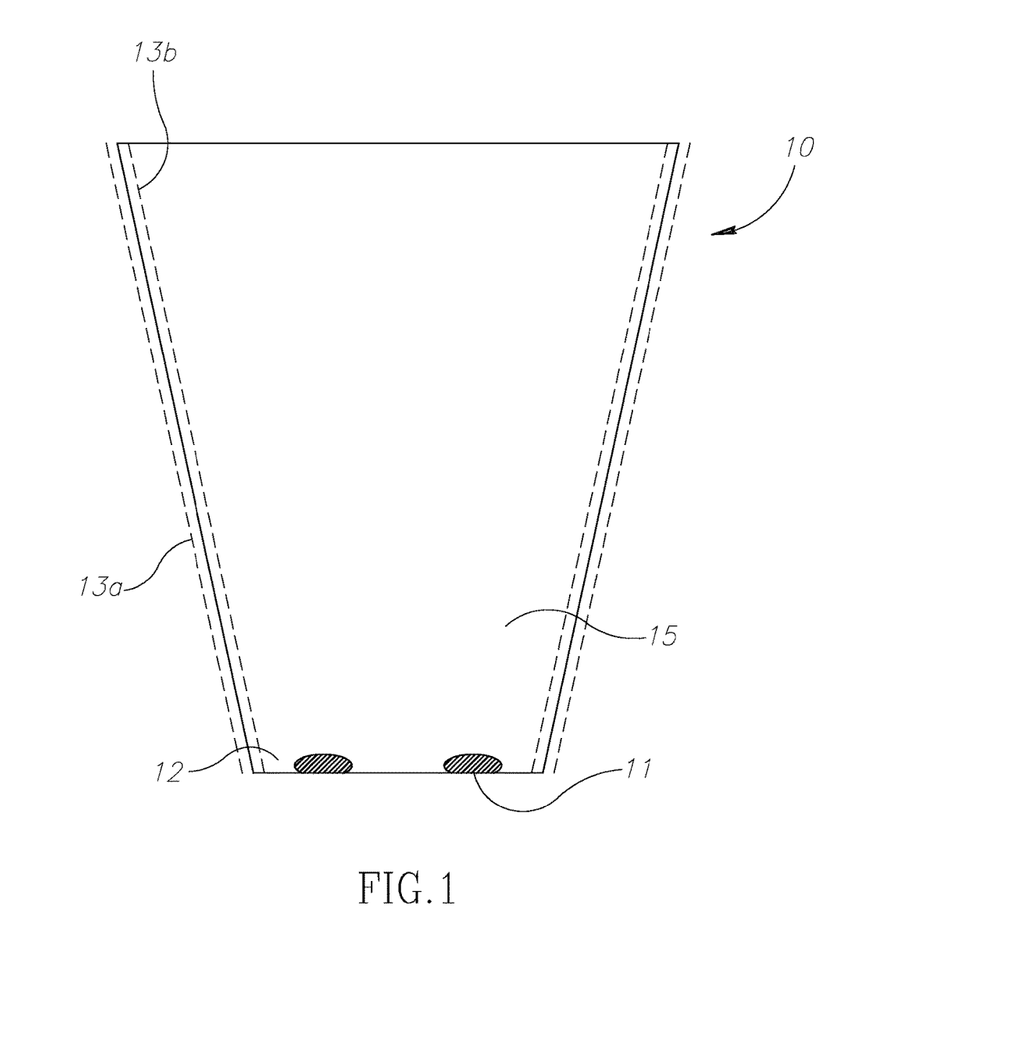
FIG. 1 is a schematic illustration of a plant pot manufactured with the mixture according to one embodiment of the invention.

Reference is now made to FIG. 1 which schematically illustrates a bio-degradable plant pot according to embodiments of the invention. A bio-degradable pot (10) may include a body (15) made of an organic waste mixture according to embodiments of the invention, for example, any of the mixtures described in the Examples.

Water may be added to a mixture containing organic waste and an adhesive to obtain a dough-like composition that may be shaped into pots or other articles (such as food-ware). The articles are then dried (possibly while heating). According to another embodiment the mixture is shaped into a pot by press forming or by thermoforming Other methods may be used for preparing the body (15) of pot (10).

A typical plant pot (10) includes drainage holes (11) in its bottom part (12). According to one embodiment the outer walls and/or inner walls of the body (15) of the plant pot (10) may be coated (coating 13a and 13b correspondingly), by spraying or any other suitable method of coating. The coating (13a and 13b) may serve as a sealant to prevent early degradation of the organic mixture composing the pot.

Plant pots may be manufactured in assorted sizes, for example, 5.5, 12 and 18 cm diameter, and of 3, 4, 5, 6, 7, 8 and 9 L.

Figure 2A:
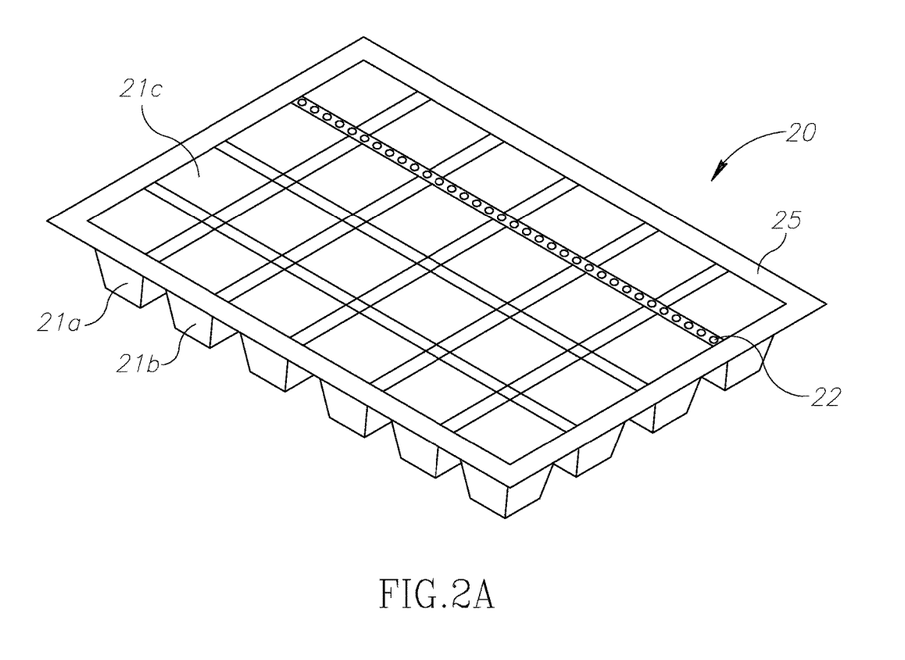
FIGS. 2A and 2B are schematic illustrations of a biodegradable trays according to embodiments of the invention.

In yet a further aspect, the present invention provides a biodegradable tray for seedlings or young plants. FIG. 2A schematically illustrates a biodegradable tray according to one embodiment of the invention. The tray (20) is made of rows (and columns) of cells (21a, 21b, 21c, etc.) attached to each other or held together by a framework (25) to provide a matrix of cells. The cells (21a, 21b, 21c) are made of a biodegradable material, for example, the mixtures exemplified herein. According to some embodiments both the cells (21a, 21b, 21c) and the framework (25) are made of biodegradable material.

According to one embodiment the framework (25) includes weakened areas (22), typically located in between adjacent cells. The weakened areas (22), which may be thin or perforated areas, allow easy detachment of individual cells from the tray (20).

According to one embodiment the cells (21a, 21b, 21c) are cone or frustoconical shaped. This shape of cells may be advantageous while planting a plant in its cell, as will be further exemplified with reference to FIG. 3A.

Thus, individual cells or the whole tray or parts of the tray (20) which may contain seedling plugs may be planted directly in soil. The planted tray or parts of tray will eventually disintegrate in the soil leaving the seedling to flourish.

A tray according to embodiments of the invention may further be fully or partially coated as described in PCT/IL2011/000739 to enable "scheduled" disintegration of the biodegradable tray.

Figure 2B:
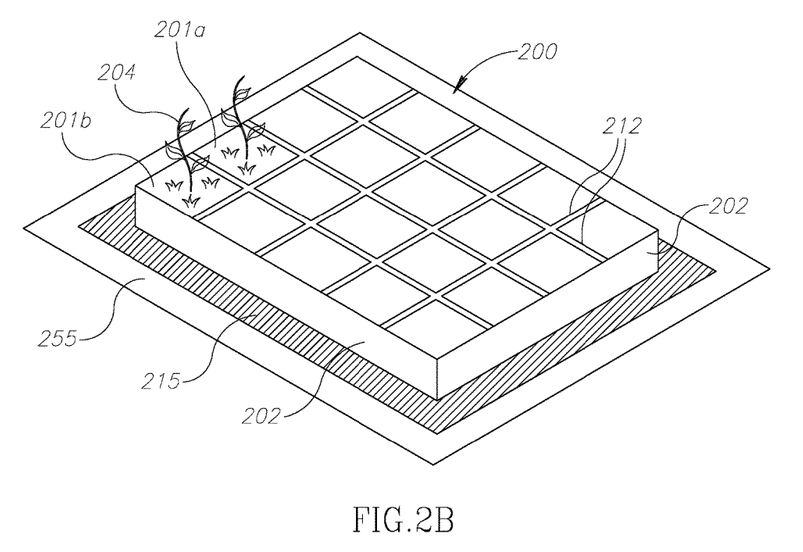

A planting tray according to another embodiment of the invention is described in FIG. 2B.

A tray (200) includes walls (202) and partitions (212) made of biodegradable material, e.g., the mixtures describes herein. The tray (200) is placed within a frame construction (215) such that the walls of the construction (215) surround the tray (200). The tray within the frame construction is placed on a cutting board (255), which is typically part of an automated planting machine.

Individual cells (201a and 201b) within the tray (200) are defined by partitions (212) and each cell may contain a plant (204). The partitions (212) may be cut before planting by a transplanting machine (as further described with reference to FIG. 3B) to obtainindividual cells (201a and 201b) that may be planted as a single unit with their plant (204). After being planted in the ground the cell may be degraded in the soil, leaving the plant (204) to flourish.

Embodiments of the invention provide rigid planting receptacles. For example, pot (10) (Fig.1) or any of cells (21a, 21b or 21c) or (201a and 201b) (FIGS. 2A and B) may be used as a rigid planting receptacle.

Figure 3A:
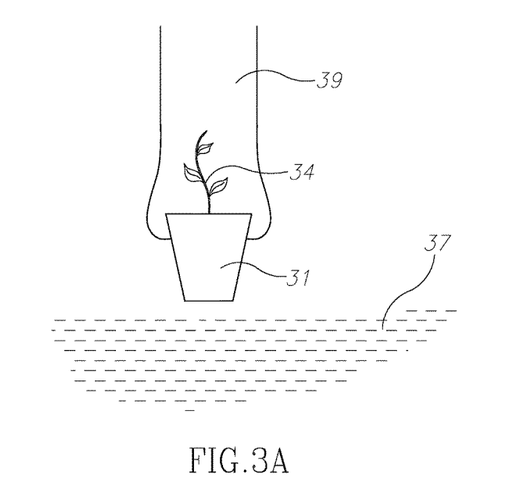
FIGS. 3A and 3B schematically illustrate methods of transplanting using a rigid bio-degradable receptacle according to embodiments of the invention.

FIG. 3A schematically illustrates how a rigid biodegradable planting receptacle may be used to facilitate automated planting, according to an embodiment of the invention. Appropriate crops such as tomato or other vegetable seedlings may be planted, for example in a biodegradable tray resembling tray (20). The cells of the tray are typically rigid enough to be handled by a transplanting machine while protecting the roots of the seedlings planted in them from pressure related damage. Prior to planting in the field (37) cells (31) having seedlings (34) in them are detached from the tray and may thus be individually handled by an automated arm (39) of a transplanting machine (not shown) without imparting pressure from the automated arm (39) to the seedling (34) roots. The cell (31) has a typically conical or frustoconical shape which may assist in creating a pit in the soil while pushing the cell (31) into the soil during planting. The cell (31), which is made of biodegradable material, for example, from the mixtures exemplified herein, is directly planted in the soil of the field (37) and will eventually disintegrate in the soil, leaving the seedling (34) to grow in the field (37). A tray may be broken into cells and the cells may be lined up and planted by a suitable transplanting machine.

Figure 3B:
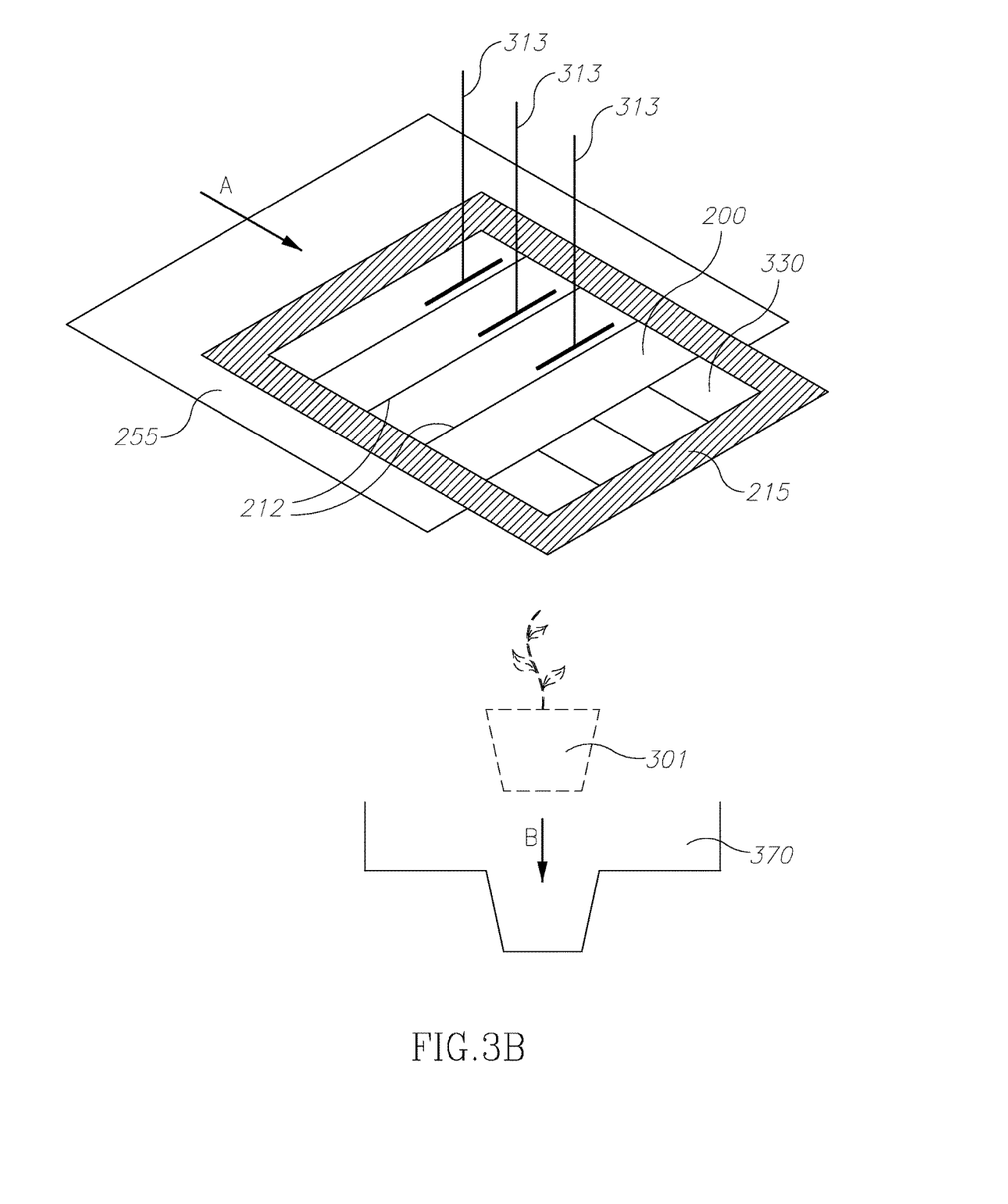

According to one embodiment detaching of individual cells from the tray may be effected by an automated system, adapted to a transplanter machine, thus reducing cost and time of planting. Such a method of automated planting, according to another embodiment of the invention, is schematically illustrated in FIG. 3B.

A tray such as tray (200) surrounded by a frame structure (215) is placed on a cutting board (255) of a transplanting machine. Knives (313) of the transplanting machine cut along partitions (212) of the tray (200) leaving half of the partition as a wall for one cell and the other half of the partition as a wall for the adjacent cell. Both longitudinal and transverse partitions are typically cut, for example, by turning the tray (200) or the set of knives (313) 90° for each cutting session, such that individual cells such as cell (310) may be formed after cutting.

Typically the frame construction (215) and the cutting board (255) are made of stainless steel or other metal.

After cutting, each cell is encased by the biodegradable rigid material that constituted partitions (212). After individual cells are produced by the cutting knives (313) the construction (215) holding the tray (200) may be pushed in the direction of arrow A such that a row (330) of cells is left without a bottom or floor. The cell in this row (330) will thus fall in the direction of arrow B, into a planting device (370).

This method of planting ensures that plants are advantageously protected during planting.

According to some embodiments, the biodegradable receptacle with the seedlings/young plants may be watered before planting, aborting the need for watering the receiving soil, and thus avoiding the complications resulting from muddy soil. Furthermore, watering the seedlings/young plants before transplantation also prevents their dehydration during the process of transplantation.

Thus, according to embodiments of the invention a cell or other receptacle may be transplanted into the soil together with the seedling/young plant like one unit.

In a specific embodiment of this aspect of the invention, the biodegradable rigid receptacle for seedlings or young plants is prepared or made out of the mixture of the invention as described herein. Such biodegradable rigid receptacle for seedlings or young plants which may be made with the mixture of the invention is thus advantageous over current transplantation techniques for the following reasons, amongst others:

It is biodegradable, and therefore the seedling or young plant may be planted together with the receptacle without the need for transplantation.

Being biodegradable, the receptacle decomposes at the site of implantation, contributing and enriching the nutrition of the soil surrounding the young plant.

In another embodiment, the term "mixture" according to the invention includes the terms "suspension" or "dispersion". In another embodiment, a mixture as described herein is homogeneous. In another embodiment, a mixture as described herein is obtained by vigorous mixing in an aqueous solution such as water.

In another embodiment, "water" is deionized water. In another embodiment, "water" is lukewarm water. In another embodiment, the term "comprise" includes the term "consist" or is replaceable by the term "consist". In another embodiment, the term "about" includes ±10% of the indicated value. In another embodiment, the term "about" includes ±7.5% of the indicated value. In another embodiment, the term "about" includes ±5% of the indicated value.

The following Examples are representative of techniques employed by the inventors in carrying out aspects of the present invention. It should be appreciated that while these techniques are exemplary of embodiments for the practice of the invention, those of skill in the art, in light of the present disclosure, will recognize that numerous modifications can be made without departing from the intended scope of the invention.

EXAMPLES

Example 1

Mixture I and Method of Preparation

Biodegradable mixture I:
60 g mixture of soil and sawdust
30 g wheat flour
2 ml methylcellulose (from a 125 g/10 L concentrated solution)
2ml glycerol
60 ml water All components are mixed together with water at boiling temperature (approximately 100° C.).

Example 2

Mixture II and Method of Preparation

Biodegradable mixture II:
55 g mixture of soil and sawdust
28 g wheat flour
2 g methylcellulose (from a 125 g/10 L concentrated solution)
2 ml glycerol
60 ml water All components are mixed together with water at boiling temperature (approximately 100° C.).

Example 3

Mixture III and Method of Preparation

Biodegradable mixture III:
65 g mixture of soil and sawdust
32 g wheat flour
2 g methylcellulose (from a 125 g/10 L concentrated solution)
2 ml glycerol
60 ml water All components are mixed together with water at boiling temperature (approximately 100° C.).

Example 4

Mixture IV and Method of Preparation

Biodegradable mixture IV:
60 g mixture of coffee residue
30 g wheat flour
2 ml methylcellulose (from a 125 g/8.5 L concentrated solution)
2 ml glycerol
60 ml water
All components are mixed together with water.

Example 5

Mixture V and Method of Preparation

Biodegradable mixture V:
95 gr saw dust
50 gr soil
95 gr compost
100 gr wheat flour
6 g mucilage (optional)
6 g potassium sorbate (optional)
6 cc Propylene glycol
10 cc methylcellulose (from a 125 g/10 L (water) concentrated solution)
10 cc glycerol
230 cc water
Ash 40-50 gr (cellulosic/lignocellulosic)

The process of making the mixture included the following pre-preparation of sawdust and/or wood chips in organic acid solution; 25% of the starch (flour) was added; steam was applied to approximately 15% humidity and kept in such conditions until it was added to the rest of the material.

The materials were added under constant mixing (lukewarm water, methyl cellulose, propylene glycol, and glycerol. These materials were adequately mixed until a homogenous mixture was obtained.

Then, the following were added: organic acid mixture, potassium sorbate, mucilage (in this recipe fenugreek was chosen; but mucilage material can include but is not limited to: *Aloe vera*; *Basella alba* (Malabar spinach); cactus; *Chondrus crispus* (Irish moss); *Dioscorea opposita* (nagaimo, Chinese yam); *Drosera* (sundews); *Drosophyllum lusitanicum*; fenugreek, flax seeds; kelp, liquorice root; marshmallow; mallow; mullein, okra; *parthenium; pinguicula* (butterwort); Psyllium seed husks; *salvia hispanica* (chia) seed; *Ulmus rubra* bark (slippery elm)).

The above materials were adequately mixed for <1 min, until mixture became homogenous. Then the following were added: cellulosic/lignocellulosic material (here, wood; can be nutshells, etc.); may include wood ash: the equivalent of 2.5-4 g per pot, starch (wheat starch; can include, but not limited to: potato, rice, corn starches), compost and/or humus; may include addition of "compost tea": 1-3 mL per pot, soil/dirt mixture, optional addition at this stage may include any of a series of known slow-release fertilizer compounds (e.g. Osmocoat, potassium humate granular, etc.)).

These materials were adequately mixed until mixture became adequately homogenous; dough stored in a proofer to maintain moisture levels and to increase material temperature to 30-50° C.

The pots were created by press. The press process comprised of two or three separate parts :the base, or 'male' counterpart; the sheath, or 'female' counterpart; and the plunger. Alternately, the sheath and plunger were combined into one piece (the sheath-plunger).

The parts of the press are pre-heated (base: 135° C., sheath: 150-170° C., plunger: 145-160° C., or sheath-plunger: 150-170° C.). Each of the parts was oiled with an emulsion of water and palm oil in a 40:60 ratio.

The obtained dough like mixture was separated via automated procedure into small flattened-spherical masses, whose weight will depend on the product being formed (e.g. for 12 cm pot—130-150 g each. These masses were situated onto the base of mold; and the plunger, or the sheath-plunger was raised slowly down all the way onto the base (30-180 s).

The temperature of mold pieces was increased to: base, 170-220° C.; sheath, 170-220° C.; plunger, 160-200° C., or sheath-plunger, 160-200° C.; the material was baked in this way for 4-6 minutes; alternatively the material was injected and was molded into its final shape. The mold was either opened at once, or pre-cooled and then opened; the pot was then removed from the base, and allowed to further cool to room temperature.

Coating Process

Pre-coating spray or dip was applied using water and/or water oil in 50:50 emulsion containing antibacterial/antifungal material, including but not limited to: methyl paraben, Trelin TC®, additional organic acids. The coating process was conducted either by immersion in solution, thermofilm-coated, or spray coated Immersion entails 5 seconds to 10 minutes in solvent (includes, but not limited to ethyl acetate, methylene chloride, butyl acetate, acetone, butanol) containing dissolved PLA (Natureworks, series 2000 or 4000 and/or Toyobo, Vyloecol BE400).Disclosed and described, it is to be understood that this invention is not limited to the particular examples, process steps, and materials disclosed herein as such process steps and materials may vary somewhat. It is also to be understood that the terminology used herein is used for the purpose of describing particular embodiments only and not intended to be limiting since the scope of the present invention will be limited only by the appended claims and equivalents thereof.

Physical Characteristics of a Pot Made from the Mixture of the Invention

Average weight of uncoated pot: 75.0±3.0 g
Average material density of uncoated pot: 0.79 (±0.3) g/mL
Thickness of material: upper rim 0.4±0.05 cm; body 0.25±0.05 cm; base 0.8±0.05 cm.
Vertical strength of uncoated pot=70 kg pressure applied on pot rim (described below) ~5 kg/cm$^2$
Vertical strength of coated pot=80 kg pressure applied on pot rim (described below) ~6 kg/cm$^2$
Lateral strength of uncoated pot=~3-4 kg
Lateral strength of coated pot=~6 kg
Punch test strength of uncoated pot: top of pot/near bottom of pot/average=6.4/10.6/8.5 kg/cm$^2$
Punch test strength of coated pot: top of pot/near bottom of pot/average=8.5/13.8/11.2 kg/cm$^2$ Thicknesses were measured using a vernier caliper. Vertical strength was measured as the weight required to crush pots 30 mm (top to bottom, with pot standing upright) by lowering a vertically sliding platform outfitted with gradually increasing weights. Lateral strength was measured using a similar set up, with the requirement to crush the pots 50 mm (container lying on its side with a weight placed on the top edge of the container). Punch test strength was measured using a hand-held penetrometer unit (QA Supplies, FT-444, Capacity: 20 kg×200 g), outfitted with a 1.1 cm plunger tip, and applied to the walls of the pot at about 2 cm from the top of the pot, and about 2 cm from the bottom of the pot.

The invention claimed is:

1. A biodegradable mixture comprising (i) at least one compost, (ii) at least one organic adhesive component and (iii) at least one organic plasticizer or emulsifying agent, wherein said at least one compost is in the form of particles that are 0.125 mm to 2 mm in size, and wherein the at least one organic adhesive component comprises a cellulosic material and flour, and wherein the weight ratio of said at least one organic compost compared to said at least one organic adhesive is about 1:1 to 3:1.

2. The mixture of claim 1, further comprising mucilage, a sorbic acid salt, propylene, or any combination thereof.

3. The mixture of claim 1, wherein said organic plasticizer or emulsifying agent is any one of glycerol, glycerin, PEG, or any combination thereof.

4. The mixture of claim 1, further comprising water.

5. The mixture of claim 4, the weight ratio in said mixture of said water compared to said at least one compost is at least 1:5.

6. The mixture of claim 1, in the form of a plant bio-degradable article.

7. The mixture of claim 6, wherein said plant bio-degradable article has an average material density of: 0.8 (±0.4) g/mL.

8. The mixture of claim 6, wherein said plant bio-degradable article has an upper rim thickness of: 0.4±0.1 cm; body thickness of 0.25±0.08 cm; and base thickness of 0.8±0.15 cm.

9. The mixture of claim 6, wherein said plant bio-degradable article further comprises a coating layer, said coating layer is biodegradable and comprises polylactic acid (PLA).

10. The mixture of claim 9, wherein said plant bio-degradable article has a punch test strength of 6.00±1.2 kg/cm$^2$.

11. The mixture of claim 1, wherein said organic plasticizer or said emulsifying agent comprises glycerol, and wherein the mixture further comprises: mucilage, sorbate acid salt, water.

12. A method for automatically planting a plant, comprising the step of:
  (a) providing an automatic planting container comprising a plant in said plant biodegradable article of claim 6, and
  (b) automatically planting said plant bio-degradable article, thereby automatically planting a plant.

13. The method of claim 12, wherein said bio-degradable article further comprises mucilage, a sorbic acid salt, propylene, or any combination thereof.

14. The method of claim 12, wherein said bio-degradable article has:
  (a) an average material density of: 0.8 (±0.4) g/mL;
  (b) an upper rim thickness of: 0.4±0.1 cm; body thickness of 0.25±0.08 cm; and base thickness of 0.8±0.15 cm; or
  (c) a combination of (a) and (b).

15. The method of claim 12, wherein said plant bio-degradable article further comprises a coating layer, said coating layer is biodegradable and comprises polylactic acid (PLA).

16. A process for making a mixture of claim 1, comprising the steps of:
  (a) obtaining a methylcellulose solution;
  (b) mixing said methylcellulose solution, said at least one organic plasticizer or emulsifying agent, said cellulosic material, said flour, said at least one compost, and water, thereby making the mixture of claim 1.

\* \* \* \* \*